H. H. HOLMES.
VEHICLE SPRING.

No. 175,462. Patented March 28, 1876.

Witnesses:
Henry Eichling
B. S. Clark

Inventor.
Hiram H. Holmes
By Fitch & Fitch
His Attys.

UNITED STATES PATENT OFFICE.

HIRAM H. HOLMES, OF CASSVILLE, GEORGIA.

IMPROVEMENT IN VEHICLE-SPRINGS.

Specification forming part of Letters Patent No. 175,462, dated March 28, 1876; application filed January 6, 1876.

*To all whom it may concern:*

Be it known that I, HIRAM H. HOLMES, of Cassville, Bartow county, in the State of Georgia, have invented an Improvement in Vehicle Spring-Hangers, of which the following is a specification, reference being had to the accompanying drawings, forming part hereof.

My invention consists in the combination, with a wagon-spring carrying a bar upon which the wagon body or bed is mounted, of bifurcated knuckle-irons, to which the spring is hung, and which are bolted to a bolster-bar, having suitable notches in its end, the said notched bolster-bar and the knuckle-irons being arranged to embrace and fit snugly upon the standards set in the wagon-bolster, as herein described.

Figure 1:
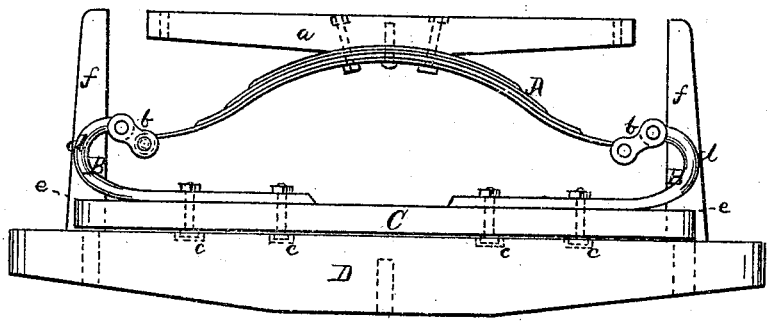
Figure 2:
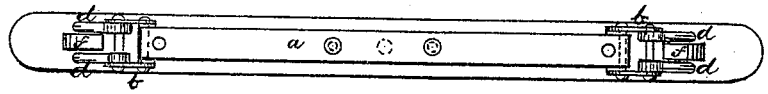

Figure 1 is a front elevation, and Fig. 2 is a plan, of a vehicle spring-hanger embodying my invention.

A is the wagon-spring, carrying the bar $a$ bolted to it, as shown, and arranged to have the wagon body or bed attached to and supported by it. The said spring A is hung upon the knuckle-irons B by means of the hangers $b$, as shown. The said knuckle-irons are bolted to the bolster-bar C, as shown, the bolt-heads being let into the wagon-bolster D at $c$, as seen in Fig. 1. The knuckle-irons are bifurcated, or divided into two arms, $d\,d$, at a point just outside, where they are given their knuckle curve, as shown, and the ends of the bolster-bar C are notched at $e$, the said notches being sufficiently deep to permit the bolster-bar carrying the knuckle-irons supporting the spring to pass to its seat on the wagon-bolster D, while the standards $f$ are embraced by the arms $d\,d$ of the bifurcated knuckle-irons and the said notches $e$, as shown in the drawings. The wagon body or bed being adjusted in place upon the bar $a$, the springs will be weighted down, and the wagon will hang between the standards $f$.

By means of my invention, I am enabled to seat the spring upon the wagon-bolster more firmly, and with less liability to wear of the parts, than in any way now practiced, while the wagon and springs are readily detached from the bolsters, and may be placed upon the ground without damage or breakage or liability to rust from contact with the earth, as is likely to occur in springs hung in the usual way.

I do not intend to claim, broadly, herein, brackets or knuckle-irons for hanging leaf or torsion springs; but

What I claim as my invention, and desire to secure by Letters Patent, is—

The combination, with the spring A, carrying the bar $a$, of the bifurcated knuckle-irons B, having arms $d$, the bolster-bar C, having notched ends $e$, and the bolster D, and standards $f$, when constructed and arranged to operate as described, and for the purpose specified.

HIRAM H. HOLMES.

Witnesses:
 R. MILAM,
 W. H. HOWARD.